Figure 1:
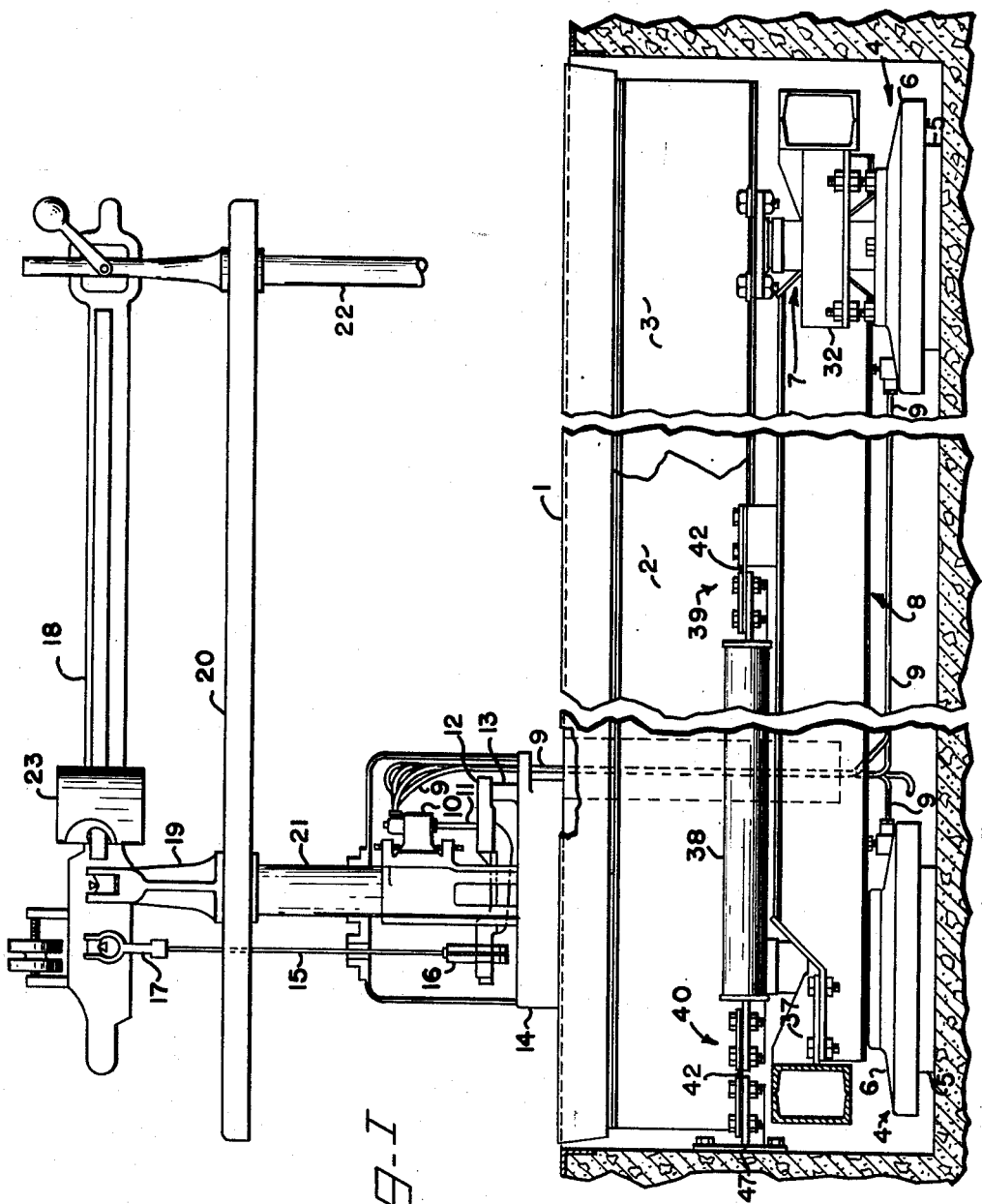

Jan. 19, 1954

L. S. WILLIAMS 2,666,634

HYDRAULIC SCALE CHECK LINK

Filed May 12, 1951

4 Sheets-Sheet 1

Inventor
LAWRENCE S. WILLIAMS
By
Marshall & Marshall
Attorneys

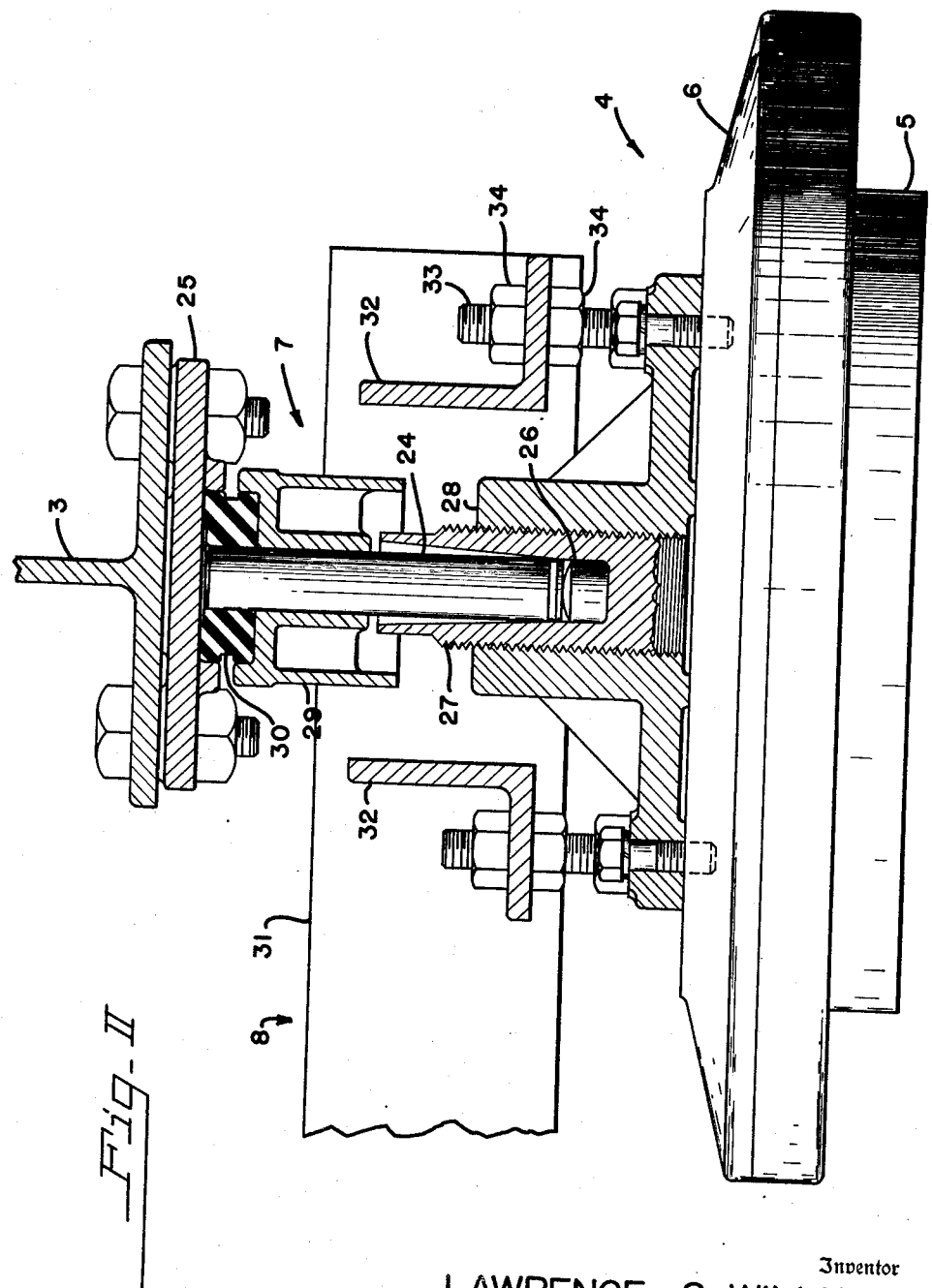

Jan. 19, 1954　　　　　　L. S. WILLIAMS　　　　　　2,666,634
HYDRAULIC SCALE CHECK LINK
Filed May 12, 1951　　　　　　　　　　　　　　　　4 Sheets-Sheet 3
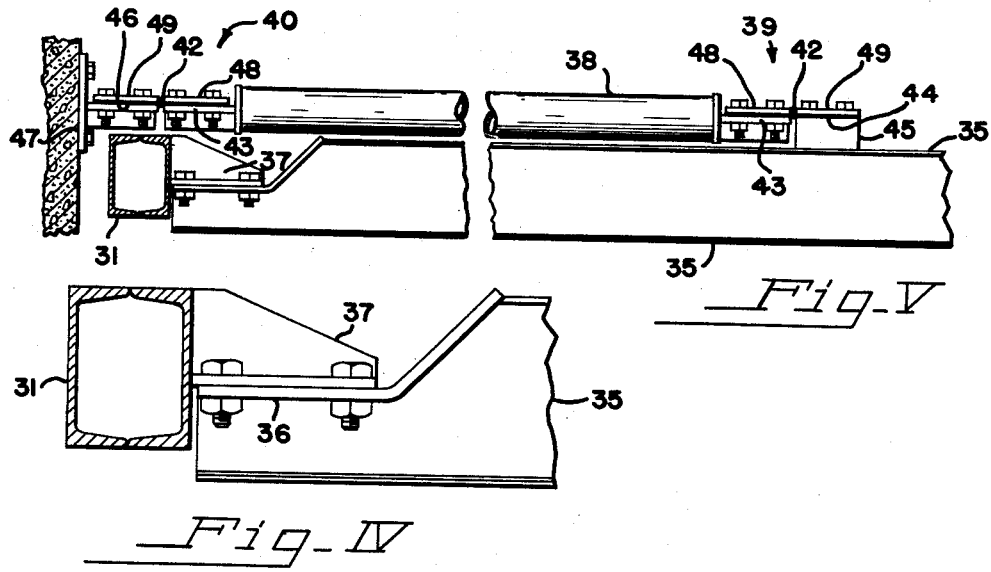
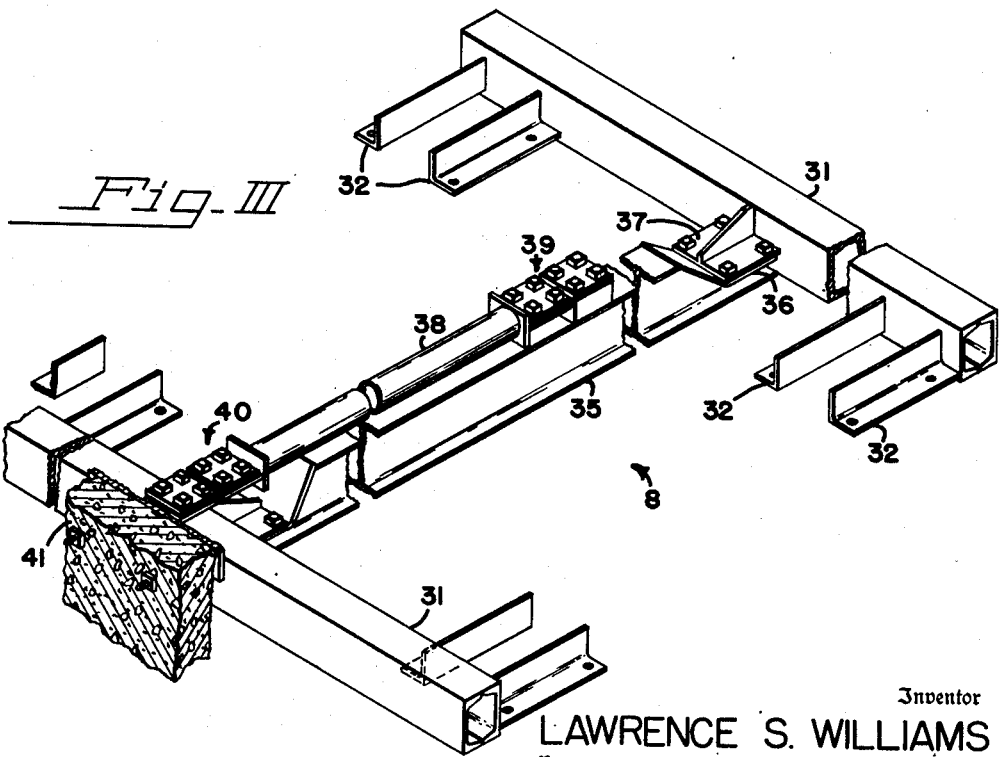
Inventor
LAWRENCE S. WILLIAMS
By
Marshall and Marshall
Attorneys

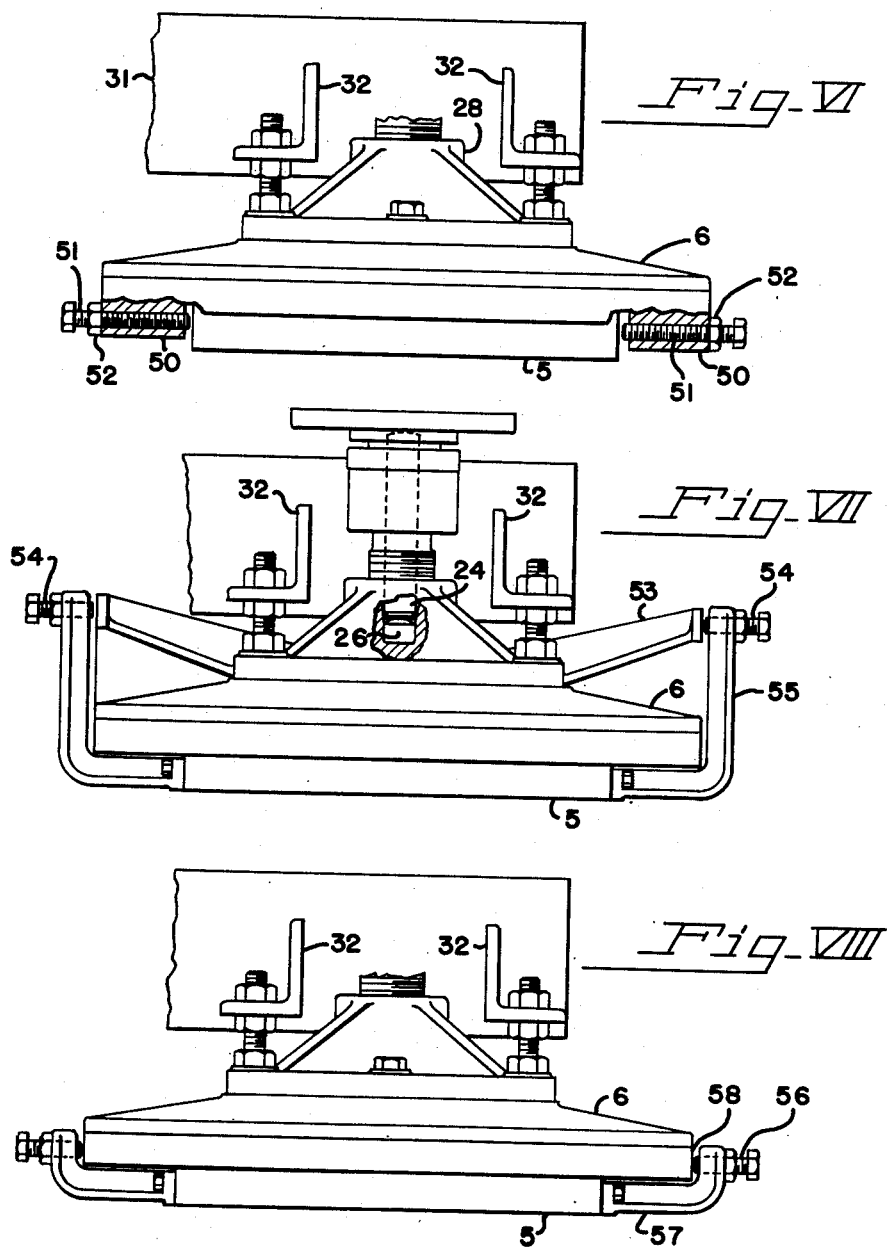

Patented Jan. 19, 1954

2,666,634

UNITED STATES PATENT OFFICE 2,666,634

HYDRAULIC SCALE CHECK LINK

Lawrence S. Williams, Toledo, Ohio, assignor to Toledo Scale Company, Toledo, Ohio, a corporation of New Jersey Application May 12, 1951, Serial No. 225,936

6 Claims. (Cl. 265—47)

This invention relates to hydraulic weighing scales and in particular to a structure for maintaining the movable portions of hydraulic capsules supporting a load receiver in operative condition and protecting each capsule from horizontally directed forces such as are produced as trucks are driven onto or from the load receiver.

In order to secure accurate indication of weight in a hydraulic weighing scale it is necessary that the hydraulic capsules, the elements which translate load force into hydraulic pressure, be extremely accurate in area and be sufficiently flexible for movement in a vertical direction so that, within the operating range, the load force is supported solely by the hydraulic pressure that is developed within the capsules. To satisfy these requirements it is necessary that a reinforcing membrane serving as a flexible connection and fluid seal between the upper and lower parts of the capsule be made quite thin and flexible. As a result these parts are quite vulnerable to damage from horizontal deflection of the movable capsule element. While it has been customary to rigidly interconnect the several capsules of a hydraulic weighing scale by means of a generally H-shaped frame and to support the load receiver by means that accommodate relative horizontal movement between the load receiver and the capsule it has invariably been found that sufficient horizontal force is transmitted to the capsule under certain conditions of operation to very seriously shorten the life of the capsules.

Accordingly it is an object of this invention to provide a stabilizing structure that securely holds the capsule elements from relative horizontal movement without introducing vertical components of force or otherwise affecting the weighing accuracy of the scale.

Another object of the invention is to provide means for limiting horizontal movement of a framework that interconnects the separate capsules of a weighing scale.

A still further object of the invention is to provide stabilizing means comprising a check link connected by means of flexure plates to the capsule interconnecting frame and to a rigid anchorage.

A still further object of the invention is to provide stops on the capsule to limit relative horizontal movement in a direction transverse to the normal movement of traffic across the load receiver.

More specific objects and advantages are provided by an improved weighing scale structure constructed according to the invention.

According to the invention a framework, independent of the load receiver, rigidly interconnects the load receiver portions of a plurality of hydraulic weighing scale capsules, and one or more check link members each disposed in a horizontal plane connects the interconnecting frame to a rigid anchorage or to the side of an enclosure housing the load receiver and capsules.

A preferred embodiment of the invention is illustrated in the accompanying drawings.

In the drawings:

Figure I is a side elevation of a hydraulic weighing scale embodying the invention.

Figure II is an enlarged view in front elevation, partly in section, showing a suspension system for supporting a load receiver.

Figure III is an isometric view of a capsule interconnecting frame and stabilizing member or check link for connecting such frame to a rigid anchorage or foundation.

Figure IV is an enlarged sectional detail showing the connection between a cross member and the longitudinal member of the H-shaped interconnecting frame.

Figure V is a vertical longitudinal section of the interconnecting frame showing in particular the check link or stabilizing member connected between the frame and the foundation.

Figure VI is a side elevation of a capsule showing adjustable stops for limiting lateral movement of the movable capsule portion with respect to the stationary portion.

Figures VII and VIII are views similar to Figure VI, Figure VII showing the stops arranged in the same horizontal plane as the point of application of load force to the capsule, while Figure VIII shows a slightly different construction for the stops.

These specific figures and the accompanying description are intended to merely illustrate the invention but not to impose limitations on the claims.

In a hydraulic weighing scale embodying the invention, a load receiver 1 having a deck supported on longitudinal stringers 2 and 3 is supported at its corners by a plurality of hydraulic capsules 4. In Figure I the longitudinal stringer 2 is at the far side of the receiver 1 while the stringer 3 is adjacent the near side. Each of the load supporting capsules 4 includes a lower stationary member 5 and a hydraulically supported upper movable member 6. The upper or movable member 6 supports a suspension system 7 (shown in detail in Figure II) and is also connected to similar parts of the other capsules by means of an H-shaped stabilizer or interconnecting frame 8, shown in detail in Figure III.

Loads applied to the load receiver 1 are transmitted to the capsules 4 and there converted into hydraulic pressure which is transmitted through individual pressure lines 9 to a plurality of pressure receivers 10 which convert the hydraulic pressure to a force which is transmitted through rods 11 to a lever 12 fulcrumed on a pedestal 13 which is part of a standard 14. The forces transmitted to the lever 12 are in turn transmitted through a steelyard rod 15 and stirrups 16 and 17 to a weigh beam 18 fulcrumed on a stand 19 erected from a beam shelf 20. The beam shelf 20 may be supported from stands 21 and 22 erected from the standard 14 and any other suitable foundation. A poise 23 slidably mounted on the beam 18 offsets the force applied through the steelyard rod 15 and by its position along the beam 18, indicates the magnitude of the force.

In order that the position of the poise 23 may be an accurate indication of the load on the load receiver 1, it is necessary that the capsules 4 accurately convert the applied load force to hydraulic pressure at a constant ratio and without adding or subtracting extraneous forces. It is further necessary that the pressure receivers 10, each of which includes a corrugated metal bellows, also accurately convert hydraulic pressure into mechanical force.

Referring now to Figure II the hydraulic capsule 4, which may be constructed substantially in accordance with the disclosure of Figures 9 to 13 of U. S. Patent No. 2,359,721, dated October 3, 1944, supports the suspension system 7 on its upper surface. The suspension system 7 comprises a strut 24 the upper end of which is a portion of a spherical surface having a radius of curvature slightly less than the length of the strut 24 arranged to cooperate with a pressure plate 25 attached to the stringer 3. The lower end of the strut 24 is flat and is supported on the upper rounded surface of a button 26 seated in the cylindrical bottom of an otherwise tapered bore of a vertically adjustable socket 27 of the suspension system. The adjustable socket 27 is threaded into a base member 28 bolted to the movable member 6. A shield and collar 29 shrunk on the strut 24 prevents the ingress of foreign material into the tapered bore and also, on its upper surface supports a rubber member 30 that centers the strut 24 on the pressure plate 25. The restoring force of the rubber member 30 when compressed by tipping of the collar 29 tends to maintain the strut 24 normal to the surface of the pressure plate 25. The radii of curvature of the curved surfaces of the strut 24 and button 26 are selected so that the load receiver, including the stringer 3, with respect to horizontal motion is practically in neutral equilibrium. If the load receiver is in neutral equilibrium in response to horizontal movement there is no restoring or upsetting force tending to move the load receiver horizontally from whatever position it may be. Consequently it is desirable that the combination of the rubber member 30 and the radii of curvature of the strut 24 and button 26 be selected so that the combination exhibits slightly stable equilibrium. In other words, the load receiver tends to assume a position such that the strut 24 is substantially vertical or normal to the pressure plate 25.

When the load receiver is deflected horizontally, the point of the load application shifts slightly on the capsule because of the rolling action of the strut 24 on the round surface on the button and a tipping force is applied to the capsule because the point of load application is a substantial distance above the hydraulic chamber of the capsule. If the capsule is allowed to tip it tends to slightly change its effective area and the accuracy of the scale suffers accordingly. To prevent the tipping of the movable capsule members, they are interconnected by means of the H-shaped interconnecting frame 8 which includes box-sectioned arms 31 at each end of the scale. Each arm 31 has two pair of short longitudinally directed angle-irons 32 that straddle the adjacent load suspension systems 7 erected from the capsules at that end of the load receiver. The longitudinally directed angle irons 32 are each adjustably secured to the upper members 6 of the capsules 4 by studs 33 and positioning nuts 34.

The box-sectioned arms 31 of the H-shaped interconnecting frame 8 are, in turn, connected together by a longitudinally extending I-beam 35 the ends of which are provided, at the neutral axis of the I-beam 35, with attaching plates 36 to which are bolted braces 37 rigidly secured to box-sectioned arms 31. The clearances in the bolt holes in the attaching plates 36 and braces 37 permit a small amount of adjustment without otherwise affecting the rigidity of the interconnecting frame.

The H-shaped frame 8, by itself, in interconnecting the movable members 6 of the several capsules is able to prevent tipping of the movable capsule members 6 but cannot prevent lateral movement of the members 6 when the load receiver is horizontally displaced. This follows because the horizontally directed forces transmitted to the several capsules are all directed in the same direction and thus move the members 6 and the interconnecting frame 8 as a unit. In large truck scales the horizontally directed forces may be very large because it is possible and easy for a truck driver to lock his brakes as he drives onto the load receiver and thus exert a horizontal force which in some cases may be substantially equal to the weight of the truck. While bumpers are ordinarily installed to limit the lateral movement of the load receiver within the limits of the pit or scale enclosure, the movement allowed by such bumpers is usually enough to cause early failure of the capsules.

According to the invention the transmission of such force to the capsules is prevented by a check link 38 in the form of a horizontal strut or column having one end connected through a flexure plate assembly 39 to the I-beam 35 of the H-shaped frame 8 and having its other end connected through a similar flexure plate assembly 40 to a foundation or anchorage 41 which may be a pier or abutment erected in the pit that receives the load receiver and supporting structure. The check link 38 is positioned parallel to the longitudinal I-beam 35 of the H-shaped frame 8 and may be made of substantial length. In this instance it is approximately half the length of the longitudinal I-beam 35. The only requirement as to length of the check link 38 is that during normal vertical movement of the H-shaped frame 8, the resisting spring force of flexure plates 42 of the assemblies 39 and 40 shall not supply appreciable load offsetting force. The flexure plate assemblies 39 and 40 are shown in considerable detail in Figures I and V. Each of these assemblies includes a flat longitudinally extending member 43 which provides a horizontal surface in line with or substantially coplanar with a similar surface 44 of a block 45 attached to the I-beam 35 and a similar surface 46 of a rigid member 47 attached to the anchorage 41. The flexure plates 42, arranged in a horizontal plane, are clamped against the surface of the members 43 by clamp plates 48 and to the block 45 and rigid member 47 by clamp plates 49. The flexure plates 42 bend slightly to accommodate the weighing movement of the capsules 4 and frame 8 but their unsupported lengths between the clamping plates are short so that they are capable of resisting the maximum horizontally directed forces that may be applied through the several suspension systems 7 to the movable members 6 of the hydraulic capsules 4.

While a check link such as the link 38 connected by flexure plates provides a very satisfactory means for preventing horizontal movement of the capsule members it is more expensive than a simple stop arranged to limit the capsule movement. It is preferred for restraining longitudinal movement because of the great magnitude of the forces applied in that direction. The laterally directed forces are of much smaller magnitude and these may be withstood by simple stops that act between the lower and upper members 5 and 6 of the capsules 4. Thus, referring to Figure VI, the upper member 6 which has a depending rim 50 may be provided with a pair or more of stop screws 51 threaded through the depending rim 50 and locked in place by jam nuts 52. The inner ends of the stop screws 51 are adjusted to be close to but not contacting the rim of the lower stationary member 5 of the capsule. These stop screws may be employed in any installation where the horizontally directed forces are small. In particular they are preferred for controlling the horizontal movement of the load receiver in the direction transverse to the movement of traffic across the scale.

Figure VII shows a similar arrangement in which the upper member 6 of the capsule 4 includes a plurality of laterally directed arms 53 the ends of which have flat vertical surfaces facing ends of stop screws 54 threaded through the upper ends of brackets 55 attached to and extending upwardly from the lower stationary member 5 of the capsule 4. It is to be noted that the engagement between the laterally directed arms 53 and stop screws 54 is in substantially the same horizontal plane as the bottom end of the strut 24 that rests on the button 26 of the suspension system. The advantage of this arrangement is that the restraining force applied by the stop screw 54 is directly in line with the laterally directed forces transmitted from the load receiver so that no tipping force is exerted when the movable member 6 of the capsule 4 is driven sideways by force exerted through tipping of the strut 24.

Figure VIII shows a slightly modified form of stop which is similar to the others in that stop screws 56 are threaded through the ends of brackets 57 attached to the lower stationary member 5 of the capsule and are in position to engage vertical surfaces 58 on the periphery of the upper member 6 of the capsule. The arrangement shown in Figure VIII is an inversion of the structure shown in Figure VI and accomplishes the same result.

The life of hydraulic scale capsules may be greatly extended and accuracy correspondingly increased by protecting the capsules from horizontal movement that tends to damage the highly stressed reinforcing membranes sealing the hydraulic chambers of the capsules. The check link and stops illustrated and disclosed provide either complete elimination of horizontal movement of each of the capsules or a limitation of the movement to that permitted by the stops. These methods of protection for the capsules may be used separately or in combination depending upon requirements of the particular scale installation.

Various modifications may be made in the specific details of construction without departing from the spirit and scope of the invention.

Having disclosed the invention, I claim:

1. In a hydraulic weighing scale, in combination, a plurality of hydraulic capsules, a load receiver supported jointly by the capsules, said capsules each comprising a stationary and a movable member, a frame interconnecting the movable members of the capsules, a fixed anchorage, and a member connecting said frame to said fixed anchorage in a manner such as to permit vertical movement of the frame while restraining the frame against horizontal movement.

2. In a hydraulic weighing scale, in combination, a plurality of hydraulic capsules, a load receiver supported jointly by the capsules, said capsules each comprising a stationary and a movable member, means intermediate the capsules and the supported load receiver for accommodating relative movement therebetween, a frame interconnecting said movable members of the capsules, a fixed anchorage, and a check link generally parallel with the frame connecting the frame to the fixed anchorage for restraining the frame from horizontal movement while permitting vertical movement thereof.

3. In a hydraulic weighing scale having a load receiver supported on a plurality of hydraulic capsules each of which comprises a stationary member and a movable member, in combination, a horizontal H-shaped frame supported at its ends by and interconnecting the movable members of the capsules, a fixed anchorage, and a check link parallel to the cross member of the H which check link connects said frame to said fixed anchorage whereby said frame and said capsules are restrained against horizontal but not against vertical movement.

4. A hydraulic weighing scale according to claim 3 in which flexure plates serve to connect the ends of the check link to the adjacent portions of the frame and anchorage.

5. A hydraulic weighing scale system according to claim 4 in which vertical surfaces having faces parallel to the check link are attached to one member of each of said capsules, and cooperating stop members are attached to the other member of each of said capsules whereby relative movement of said capsule members transverse to said check link is limited.

6. In a hydraulic weighing scale, in combination, a load receiver, a plurality of pressure transmitting hydraulic capsules that support the load receiver, means intermediate the pressure transmitting capsules and the supported load receiver for accommodating relative horizontal movement therebetween, said capsules each comprising a stationary and a movable member, a frame interconnecting the movable members of the capsules, a check link parallel to said frame, a fixed anchorage, flexure plates connecting one end of the check link to the frame and the other end of the check link to said fixed anchorage whereby the frame and capsules are held against horizontal movement in the direction in which said check link extends, one member of each of said capsules having vertical surfaces parallel to the check link, and stop members attached to the other member of each capsule and cooperating with the vertical surfaces for limiting relative horizontal movement of said capsule members transverse to the check link.

LAWRENCE S. WILLIAMS.

References Cited in the file of this patent

UNITED STATES PATENTS

| Number | Name | Date |
|---|---|---|
| 932,050 | McFarlane | Aug. 24, 1909 |
| 1,631,890 | Redick | June 7, 1927 |
| 1,997,864 | Hill | Apr. 16, 1935 |
| 2,279,912 | Bohannan | Apr. 14, 1942 |
| 2,313,655 | Marshall | Mar. 9, 1943 |
| 2,439,533 | Williams | Apr. 13, 1948 |
| 2,501,248 | Williams | Mar. 21, 1950 |
| 2,510,535 | Williams | June 6, 1950 |
| 2,523,413 | Bohannan | Sept. 26, 1950 |
| 2,531,104 | Bohannon | Nov. 21, 1950 |
| 2,549,273 | Williams | Apr. 17, 1951 |
| 2,561,321 | Tate | July 17, 1951 |